US009532036B2

(12) United States Patent
Kim et al.

(10) Patent No.: US 9,532,036 B2
(45) Date of Patent: Dec. 27, 2016

(54) STEREO SOURCE IMAGE CALIBRATION METHOD AND APPARATUS

(71) Applicant: Samsung Electronics Co., Ltd., Suwon-si (KR)

(72) Inventors: Jiwon Kim, Seoul (KR); Dongkyung Nam, Yongin-si (KR); Hyoseok Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 22 days.

(21) Appl. No.: 14/711,193

(22) Filed: May 13, 2015

(65) Prior Publication Data

US 2015/0334380 A1    Nov. 19, 2015

(30) Foreign Application Priority Data

May 13, 2014  (KR) .................. 10-2014-0057443

(51) Int. Cl.
  *G06K 9/00*    (2006.01)
  *H04N 13/04*   (2006.01)
  *G06T 7/00*    (2006.01)
  *H04N 13/00*   (2006.01)

(52) U.S. Cl.
  CPC ........... *H04N 13/0425* (2013.01); *G06T 7/002* (2013.01); *H04N 13/0422* (2013.01); *H04N 13/0445* (2013.01); *H04N 13/0497* (2013.01); *G06T 2207/10021* (2013.01); *G06T 2207/10024* (2013.01); *H04N 2013/0077* (2013.01); *H04N 2013/0081* (2013.01)

(58) Field of Classification Search
  USPC ..................................... 382/154
  See application file for complete search history.

(56) References Cited

U.S. PATENT DOCUMENTS

| 7,113,632 B2 | 9/2006 | Lee et al. |
| 8,503,765 B2 | 8/2013 | Woo et al. |
| 2007/0165942 A1 | 7/2007 | Jin et al. |
| 2010/0091092 A1* | 4/2010 | Jeong .................. G06T 15/40 348/43 |

(Continued)

FOREIGN PATENT DOCUMENTS

| KR | 1020100135032 A | 12/2010 |
| WO | WO2009-096912 | 8/2009 |

OTHER PUBLICATIONS

Fleck, Margaret M. "A topological stereo matcher." *International journal of computer vision* 6.3 (1991): 197-226. (30 pages in English).

(Continued)

*Primary Examiner* — John Strege
(74) *Attorney, Agent, or Firm* — NSIP Law

(57) ABSTRACT

An image processing apparatus and a method implemented by the image process apparatus generates a vertical disparity map through regression analysis, based on a difference between vertical coordinate values from feature correspondence information of left and right source images. A geometric difference through image warping is calibrated before depth information is restored through depth estimation. Thus, a process of optimizing a camera model may not have to be performed, and occurrence of black areas that may be caused by image rotation may be reduced.

22 Claims, 11 Drawing Sheets

(56) References Cited

U.S. PATENT DOCUMENTS

| | | | | |
|---|---|---|---|---|
| 2011/0096147 A1* | 4/2011 | Yamazaki | .......... | H04N 13/0257 348/43 |
| 2012/0189191 A1* | 7/2012 | Bai | .................... | H04N 13/0025 382/154 |
| 2014/0043447 A1* | 2/2014 | Huang | ................ | H04N 13/0425 348/51 |
| 2014/0112574 A1* | 4/2014 | Kim | ...................... | G06T 7/0018 382/154 |
| 2015/0381959 A1* | 12/2015 | Lee | .................... | H04N 13/0022 382/154 |

OTHER PUBLICATIONS

Wang, H-M., C-W. Chang, and J-F. Yang. "An effective calibration procedure for correction of parallax unmatched image pairs." *IET image processing* 3.2 (2009): 63-74. (12 pages in English).

Devernay, Frédéric, and Paul Beardsley. "Stereoscopic cinema." *Image and Geometry processing for 3-D cinematography*. Springer Berlin Heidelberg, 2010. 11-51. (41 pages in English).

Gurbuz, Sabri, Masahiro Kawakita, and Hiroshi Ando. "Color calibration for multi-camera imaging systems." *Universal Communication Symposium (IUCS), 2010 4th International*. IEEE, 2010. (6 pages in English).

Extended European Search Report issued on Oct. 27, 2015 in counterpart European Application No. 15 167 411.6 (8 pages in English).

Fusiello, Andrea, and Luca Irsara. "Quasi-euclidean uncalibrated epipolar rectification." Pattern Recognition, 2008. ICPR 2008. 19th International Conference on. IEEE, 2008.

Bay, Herbert, Tinne Tuytelaars, and Luc Van Gool. "Surf: Speeded up robust features." Computer vision—ECCV 2006. Springer Berlin Heidelberg, 2006. 404-417.

Lowe, David G. "Object recognition from local scale-invariant features." Computer vision, 1999. The proceedings of the seventh IEEE international conference on. vol. 2. Ieee, 1999.

* cited by examiner

STEREO SOURCE IMAGE CALIBRATION METHOD AND APPARATUS

CROSS-REFERENCE TO RELATED APPLICATIONS

This application claims the benefit of Korean Patent Application No. 10-2014-0057443, filed on May 13, 2014, in the Korean Intellectual Property Office, the disclosure of which is incorporated herein in its entirety by reference.

BACKGROUND

1. Field

The disclosure herein relates to methods and apparatuses for calibrating a stereo source image.

2. Description of the Related Art

A stereo, multi-view, or light-field three-dimensional (3D) video image may have to be used to perform real content-based 3D rendering on a multi-view or light-field no-glasses 3D display. Recently, many real 3D video images are in the stereoscopic form in which an image is divided into a left-eye image and a right-eye image. With regard to a multi-view generation method which is most widely used for a no-glasses 3D display, when a stereo video image is input, depth information is restored through depth estimation, and a multi-view video image is synthesized by performing depth image-based rendering (DIBR) based on the restored depth map.

SUMMARY

Provided are methods and apparatuses for calibrating a stereo source image for reducing the occurrence of black areas that may be caused by image rotation without having to perform a process of optimizing a camera model, by generating a vertical disparity map through regression analysis, based on a difference between vertical coordinate values that are included in feature correspondence information of left and right source images, and thus, calibrating a geometric difference through image warping.

Provided are methods and apparatuses for calibrating a stereo source image for performing color calibration on a whole image after obtaining a mean or a variance in a location of features according to feature correspondence information, and then, locally performing histogram matching so as to calibrate local errors.

Provided are methods and apparatuses for calibrating a stereo source image for calibrating a geometric difference and a color difference, by using feature correspondence information that is generated by extracting and matching same features.

Additional aspects will be set forth in part in the description which follows and, in part, will be apparent from the description, or may be learned by practice of the disclosed embodiments.

According to an aspect of the disclosure, a stereo source image calibration method may include: receiving an input of a stereo source image, and extracting features respectively from left and right source images, generating feature correspondence information by matching the features, extracted respectively from the left and right source images, with each other, generating a vertical disparity map with respect to the left and right source images, based on a difference between coordinate values from the feature correspondence information, and calibrating a difference between the left and right source images by using the generated vertical disparity map.

The vertical disparity map may be generated based on the difference between the vertical coordinate values through regression analysis, and statistically represents the difference between the vertical coordinate values with respect to the left and right source images.

The calibrating of the difference may include performing a shift on at least one of the left source image and the right source image, so as to calibrate a vertical-direction difference between the left and right source images.

The stereo source image calibration method may further include performing photometric calibration on the left and right source images by using the feature correspondence information.

The performing of the photometric calibration may include: calculating a statistics value of the left and right source images in a location included in the feature correspondence information, and performing first color calibration on the left and right source images based on the calculated statistics value, and performing second color calibration by performing histogram matching on left and right source images that are obtained by performing the first color calibration.

The statistics value may include a statistics value selected from an arithmetic mean value and a geometric mean value with respect to a mean value of a color image strength of the left and right source images The first color calibration may include calibrating the mean value of the left and right source images to correspond to the statistics value.

The statistics value may include a statistics value selected from a minimum value, a maximum value, an arithmetic mean value, and a geometric mean value of a variance value of the color image strength of the left and right source images The first color calibration may include calibrating the variance value of the left and right source images to correspond to the statistics value.

The photometric calibration may be performed in a color space selected from a red, green, and blue RGB color image, CIELab, and YCbCr.

A plurality of stereo source images may be input in a sequence.

Difference calibration with respect to a first stereo source image and difference calibration with respect to a second stereo source image may be independently performed.

If at least two stereo source images selected from the plurality of stereo source images forms a scene, difference calibration with respect to the at least two stereo source images may be performed by using a same vertical disparity map.

The stereo source image calibration method may further include performing in-painting for filling an area of holes generated near each boundary of calibrated left and right source images.

The regression analysis may include linear regression analysis, generalized linear regression analysis, non-linear regression analysis, kernel regression analysis, non-parametric regression analysis, and robust regression analysis.

The stereo source image calibration method may further include restoring depth information for the left and right source images, after calibrating the difference between the left and right source images by using the generated vertical disparity map.

According to an aspect of the disclosure, a stereo source image calibration apparatus may include: a feature extraction unit (feature extractor) for receiving an input of a stereo source image, and extracting features respectively from left and right source images; a feature matching unit (feature matcher) for generating feature correspondence information by matching the features, respectively extracted from the left and right source images, with each other; and a geometric calibration unit (geometric calibrator) for generating a vertical disparity map with respect to the left and right source images based on a difference between vertical coordinate values from the feature correspondence information, and calibrating a difference between the left and right source images by using the generated vertical disparity map.

The vertical disparity map may be generated through regression analysis based on the difference between the vertical coordinate values, and statistically represents the difference between the vertical coordinate values with respect to the left and right source images.

The geometric calibration unit may perform a shift on at least one selected from the group consisting of the left source image and the right source image, so as to calibrate a vertical-direction difference between the left and right source images.

The stereo source image calibration apparatus may further include a photometric calibration unit (photometric calibrator) for performing photometric calibration on the left and right source images by using the feature correspondence information.

The photometric calibration unit may include: a first color calibration unit (first color calibrator) for calculating a statistics value of the left and right source images in a location included in the feature correspondence information, and performing first color calibration on the left and right source images based on the calculated statistics value; and a second color calibration unit (second color calibrator) for performing second color calibration by performing histogram matching on left and right source images that are obtained by performing the first color calibration.

The statistics value may include a statistics value selected from an arithmetic mean value and a geometric mean value with respect to a mean value of a color image strength of the left and right source images.

The first color calibration unit may calibrate the mean value of the left and right source images to correspond to the statistics value The statistics value may include a statistics value selected from a minimum value, a maximum value, an arithmetic mean value, and a geometric mean value with respect to a variance value of the color image strength of the left and right source images.

The first color calibration unit may calibrate the variance value of the left and right source images to correspond to the statistics value.

The stereo source image calibration apparatus may further include an in-painting unit (in-painter) for filling an area of holes generated near each boundary of calibrated left and right source images.

A plurality of stereo source images may be input in a sequence, and difference calibration with respect to a first stereo source image and difference calibration with respect to a second stereo source image may be independently performed.

The stereo source image calibration apparatus may further include a depth estimator to restore depth information for the left and right source images, after the geometric calibrator calibrates the difference between the left and right source images by using the generated vertical disparity map.

According to an aspect of the disclosure, a stereo source image calibration apparatus may include: a feature extraction unit (feature extractor) for receiving an input of a stereo source image, and extracting features respectively from left and right source images; a feature matching unit (feature matcher) for generating feature correspondence information by matching the features, respectively extracted from the left and right source images, with each other; a first color calibration unit (first color calibrator) for calculating a statistics value of the left and right source images in a location from the feature correspondence information, and performing first color calibration on the left and right source images based on the calculated statistics value; and a second color calibration unit (second color calibrator) for performing second color calibration by performing histogram matching on left and right source images that are obtained by performing the first color calibration.

According to an aspect of the disclosure, an image processing apparatus may include: a stereo source image calibration unit (stereo source image calibrator) for receiving an input of a stereo source image and extracting features respectively from left and right source images, generating feature correspondence information by matching the features that are respectively extracted from the left and right source images with each other, and calibrating at least one selected from the group consisting of a color difference and a geometric difference between the left and right source images based on the feature correspondence information; a depth estimation unit (depth estimator) for restoring depth information through estimation of a depth in calibrated left and right source images; and a depth-based rendering unit (depth-based renderer) for generating a multi-view image based on the restored depth information.

According to an aspect of the disclosure, a non-transitory computer-readable recording storage medium having stored thereon a computer program, which when executed by a computer, may perform any of the methods disclosed herein.

According to an aspect of the disclosure a stereo source image calibration method includes receiving an input of left and right source images, and extracting features respectively from the left and right source images, generating feature correspondence information by matching the features, extracted respectively from the left and right source images, with each other, selectively calibrating the left and right source images by performing one or both of a geometric calibration and a photometric calibration, using the generated feature correspondence information, and restoring depth information for the left and right source images, after the calibrating of the left and right source images is performed.

The performing of the geometric calibration may include generating a vertical disparity map with respect to the left and right source images, based on a difference between coordinate values from the feature correspondence information, calibrating a difference between the left and right source images by using the generated vertical disparity map, and shifting at least one of the left source image and the right source image, so as to calibrate a vertical-direction difference between the left and right source images.

The photometric calibration may be performed using the left and right source images obtained after the geometric calibration is performed, when the selectively calibrating includes performing both the geometric calibration and the photometric calibration.

The performing of the photometric calibration may include calculating a statistics value of the left and right source images in a location corresponding to the feature correspondence information, and performing first color calibration on the left and right source images based on the calculated statistics value, and performing second color calibration by performing histogram matching on the left and right source images that are obtained by performing the first color calibration.

The geometric calibration may be performed using the left and right source images obtained after the photometric calibration is performed, when the selectively calibrating comprises performing both the geometric calibration and the photometric calibration.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
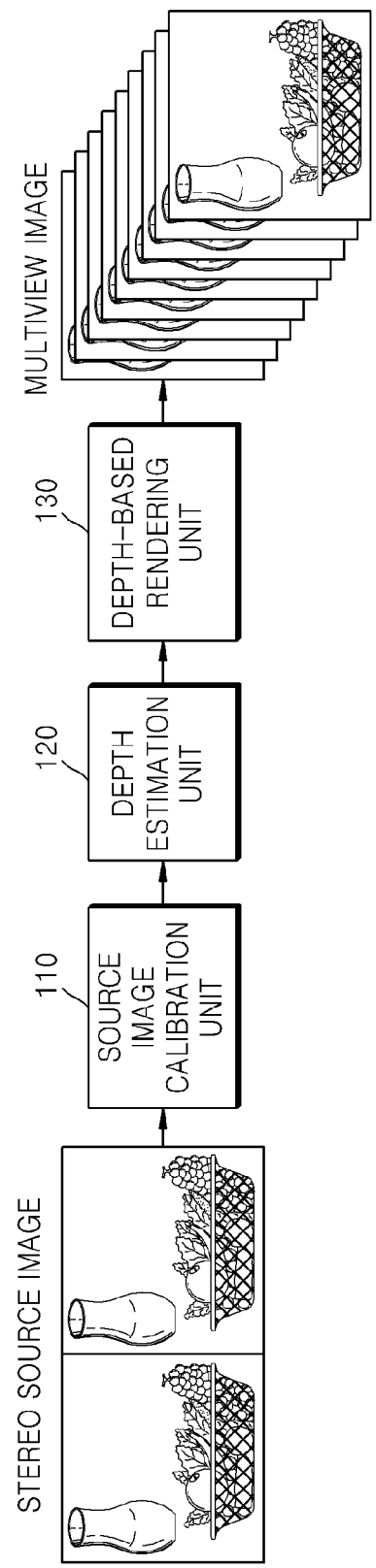
FIG. 1 is a schematic diagram of an image processing apparatus according to an embodiment.

Reference will now be made in detail to embodiments, examples of which are illustrated in the accompanying drawings, wherein like reference numerals refer to like elements throughout. In this regard, the disclosed embodiments may have different forms and should not be construed as being limited to the descriptions set forth herein. Accordingly, the embodiments are merely described below, by referring to the figures, to explain aspects of the disclosure. As used herein, the term "and/or" includes any and all combinations of one or more of the associated listed items. Expressions such as "at least one of," when preceding a list of elements, modify the entire list of elements and do not modify the individual elements of the list.

The disclosed embodiments allow for various changes and modification thereto, though particular embodiments will be illustrated in the drawings and described in detail in the written description for purposes of explanation. However, this is not intended to limit a scope of the embodiments to particular modes of practice, and it is to be appreciated that all changes, equivalents, and substitutes that do not depart from the spirit and technical scope of the disclosed embodiments are encompassed. In the description of embodiments, certain detailed explanations of related art are omitted when it is deemed that they may unnecessarily obscure the essence of the embodiments.

While such terms as "first," "second," etc., may be used to describe various components, such components must not be limited to the above terms. The above terms are used only to distinguish one component from another.

The terms used in the disclosure are merely used to describe the disclosed embodiments, and are not intended to limit the embodiments. An expression used in the singular encompasses the expression of the plural, unless it has a clearly different meaning in the context. In the present specification, it is to be understood that the terms such as "including" or "having," etc., are intended to indicate the existence of the features, numbers, steps, actions, operations, components, parts, or combinations thereof disclosed in the specification, and are not intended to preclude the possibility that one or more other features, numbers, steps, actions, operations, components, parts, or combinations thereof may exist or may be added.

Hereinafter, the example embodiments will be described more fully with reference to the accompanying drawings, in which exemplary embodiments of the disclosure are shown. Because like or similar reference numerals in the drawings denote like elements, in some instances their description will be omitted where such description would be superfluous.

FIG. 1 is a schematic diagram of an image processing apparatus 100 according to an embodiment.

Referring to FIG. 1, the image processing unit 100 may include a source image calibration unit 110 which receives an input of a stereo source image and calibrates a color difference or a geometric difference between left and right source images, a depth estimation unit 120, and a depth-based rendering unit 130. The image processing apparatus 100 may be a multi-view image generating apparatus or a light-field three-dimensional (3D) video apparatus, and may include a no-glasses 3D display apparatus. The image processing apparatus 100 may receive an input of a stereo source input image, and restore depth information through a depth estimation algorithm using the depth estimation unit 120. Then, the image processing apparatus 100 may perform depth-based rendering using the depth-based rendering unit 130 based on the restored depth information or a depth map, and thus, output a multi-view image. A stereo source image may be in the stereoscopic form in which an image is divided into a left-eye image and a right-eye image.

According to the depth estimation algorithm, it is assumed that, if a particular 3D point appears in left and right eye images, the particular 3D point is placed in a same vertical coordinate in the left and right eye images. In other words, the depth estimation algorithm may include a geometric or epipolar constraint condition. Accordingly, the depth estimation algorithm is performed to search for the particular 3D point only in a vertical direction. Also, according to the depth estimation algorithm, a photometric or Lambertian constraint condition is assumed (i.e., it is assumed color information of a left image matches color information of a right image are the same). Particularly, if one or more of the geometric and photometric/Lambertian assumptions is not valid, errors in depth estimation may occur.

In a real image, there are many cases when a geometric assumption or a photometric assumption is not valid. Causes for which such assumption is not valid may vary, for example, a difference in a zoom ratio between two cameras, a difference in a degree of toe-in, a difference in exposure time, or the like. It is not easy to capture an image by removing all the causes and completely complying with the assumptions. Since there are many cases when a toe-in operation is intentionally performed for maximizing a 3D effect in the case of a stereo movie and an image is captured without performing a precise calibration process in the case of a real image, it is difficult to estimate a camera configuration used for capturing an image.

In an embodiment, the image processing apparatus 100 may receive an input of a stereo source image and perform various operations disclosed below so as to prevent errors associated with the geometric assumption and the photometric assumption that are assumed by the conventional depth estimation algorithm described above. For example, the image processing apparatus 100 may extract features respectively from the input left and right source images, generate feature correspondence information by matching the features extracted respectively from the left and right source images with each other, and calibrate at least one of a color difference and a geometric difference between the left and right source images based on the feature correspondence information.

The image processing apparatus 100 may perform simple and robust calibration based on a feature, and thus, may calibrate a stereo source image before performing a depth estimation process. The geometric calibration may be performed by generating a vertical disparity map, and statistically generating a disparity map through various regression analysis without having to perform a process of optimizing a camera model based on feature correspondence information. After the vertical disparity map is generated, image warping may be performed by reflecting the vertical disparity map in the image warping. Photometric calibration may be performed by calibrating an image from a global viewpoint after obtaining a mean or a variance in a particular location, and calibrating local color errors through histogram matching. Accordingly, since an amount of geometric or color errors are very small in a calibrated image, it is easier to perform depth estimation and may result in fewer errors. A synthesized multi-view image complies with an intra-view and an inter-view from a geometric or photometric viewpoint.

Hereinafter, various embodiments of stereo source image calibration are described in detail.

Figure 2:
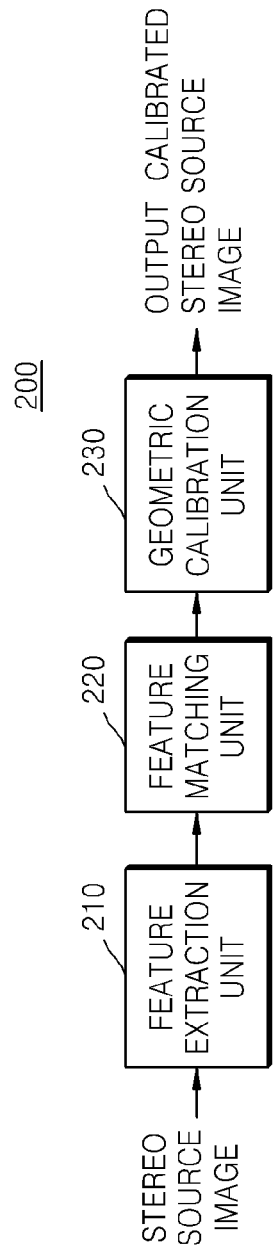
FIG. 2 is a block diagram of a source image calibration unit, shown in FIG. 1, according to an embodiment.
Figure 3:
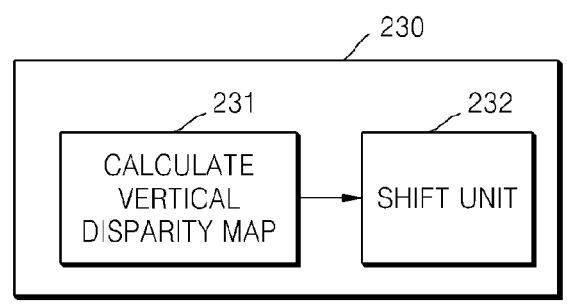
FIG. 3 is a schematic block diagram of a geometric calibration unit shown in FIG. 2.

FIG. 2 is a block diagram of a source image calibration unit 200, shown as the source image calibration unit 110 in FIG. 1, according to an embodiment. FIG. 3 is a schematic block diagram of a geometric calibration unit 230 shown in FIG. 2. Hereinafter, the source image calibration unit 200 is described.

Referring to FIGS. 2 and 3, the source image calibration unit 200 may include a feature extraction unit 210, a feature matching unit 220, and a geometric calibration unit 230. The geometric calibration unit 230 may include a vertical disparity map calculation unit 231 and a shift unit 232. According to an embodiment, feature extraction and matching may be performed on a black-and-white image or a color image, for example.

Figure 4:
FIGS. 4, 5, 6A and 6B illustrate examples for explaining geometric calibration according to an embodiment.
Figure 5:
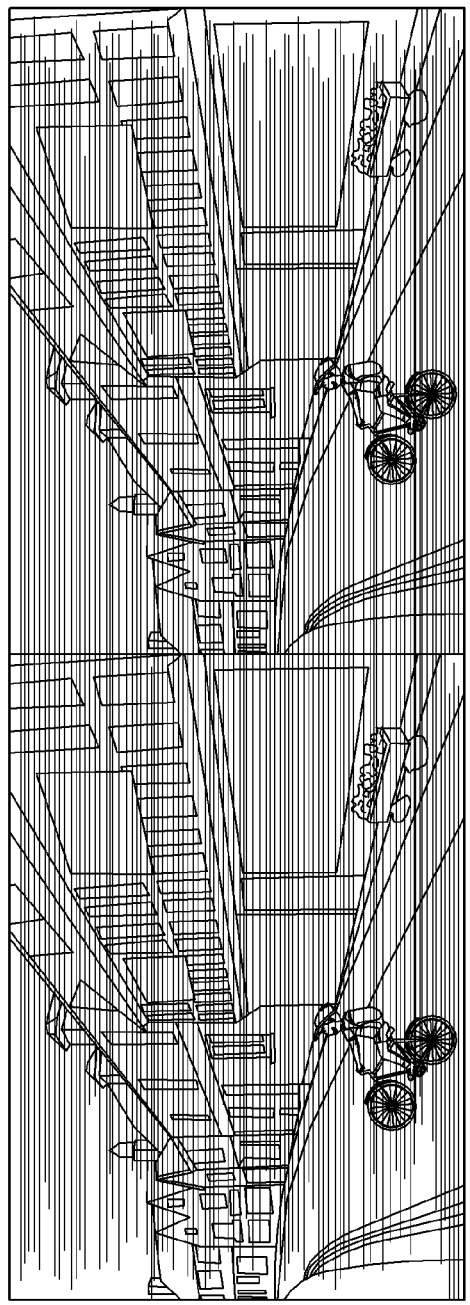

The feature extraction unit 210 may receive an input of a stereo source image and may extract features respectively from a left source image and a right source image. As shown in a left-eye image and a right-eye image in FIG. 4 and a left-eye image and a right-eye image in FIG. 5, features may be extracted respectively from the left-eye images and the right-eye images. As shown in FIG. 5, feature points corresponding to a corner area, an edge area, and an object area, and information in locations of the feature points may be extracted together. The extracting of feature points may be performed by using various feature extraction algorithms which are known to those of ordinary skill in the art, for example, scale invariant feature transform (SIFT), speeded up robust features (SURF), or the like, but is not limited thereto. Additionally, a sufficient number of features may be extracted from various parts of each image so that the features are significant in subsequent statistics analysis, and features may be extracted from various parts of each image. The extracted features may include information in a location of the features, for example, a feature vector. The features may be extracted sequentially (e.g., first from a left image then from a right image, or vice versa), or may be extracted in parallel (e.g., simultaneously extracting features from the left and right images).

The feature matching unit 220 may generate feature correspondence information by matching the features, extracted by the feature extraction unit 210, with each other.

As shown in FIG. 5, a feature extracted from the left-eye image and a feature extracted from the right-eye image may be matched with each other based on respective feature information, and feature correspondence information may be generated. In other words, extracted features, and information regarding a location of the features such as color information or location information are employed, so as to enhance reliability in statistical analysis used for geometric calibration or photometric calibration that are performed based on extracted features. Accordingly, a factor that may distort statistical analysis may be removed by using feature correspondence information, wherein the factor may include a case when left and right corresponding points are not present, for example, when a point that is present in a left-eye image is not present in a right-eye image.

The geometric calibration unit 230 may generate a vertical disparity map with respect to the left and right source images, based on a difference between vertical coordinate values that are included in the feature correspondence information generated by the feature matching unit 220, and then, may calibrate a difference between the left and right source images by using the generated vertical disparity map.

The vertical disparity map calculation unit 231 may generate a vertical disparity map with respect to the left and right source images, based on the difference between the vertical coordinate values that are included in the feature correspondence information. A distribution form of a geometric error between the left and right source images may be figured out by analyzing differences between vertical coordinate values obtained from feature correspondence information. A vertical disparity map that statistically represents a vertical error in features distributed in various locations may be generated by using regression analysis for the analyzing of the difference. Feature correspondence information may include information about a vertical-direction difference between features that respectively correspond to each other in the left and right source images in a location of the features. Information about the vertical-direction difference may be defined as a difference between vertical coordinate values. Accordingly, a difference between coordinate values in the whole left and right source images is statistically analyzed based on a coordinate value in the feature correspondence information through regression analysis. Regression analysis may include linear regression analysis, generalized linear regression analysis, nonlinear regression analysis, kernel regression analysis, nonparametric regression analysis, or robust regression analysis, but is not limited thereto.

The shift unit 232 may calibrate a difference between the left and right source images by using the generated vertical disparity map. In order to remove a vertical-direction difference between the left and right source images, the left source image may be left in an original state, and a shift in a vertical direction may be performed on each pixel of the right-eye source image. Alternately, the right image may be left in an original state, and a vertical-direction shift may be performed on each pixel of the left source image. Additionally, an intra-view error may be minimized by performing a vertical-direction shift by dividing an amount of the shift in half into the left-eye image and the right-eye image. A location to which a shift is performed may vary with each pixel of the left and right source images, and it may be understood that a shift, moving, or warping have a same meaning.

Figure 6A:
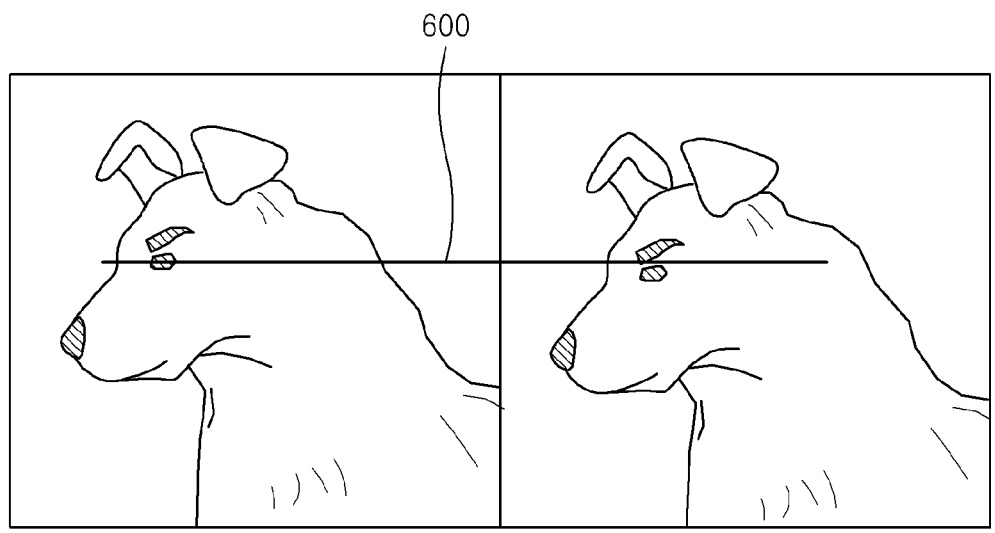

Referring to FIG. 6A, a location of an eye in a left source image along a horizontal line 600 does not match a location of an eye in a right source image along the horizontal line 600. In other words, in this case, a vertical-direction difference between the left and right source images is present.

In an embodiment, by performing geometric calibration to calibrate a vertical-direction difference between the left and right source images, a difference is reduced in left and right source images that are obtained after the calibration is performed. For example, referring to FIG. 6B, a location of an eye in a left image along a horizontal line 610 matches a location of an eye in a right image along the horizontal line 610.

Figure 6B:
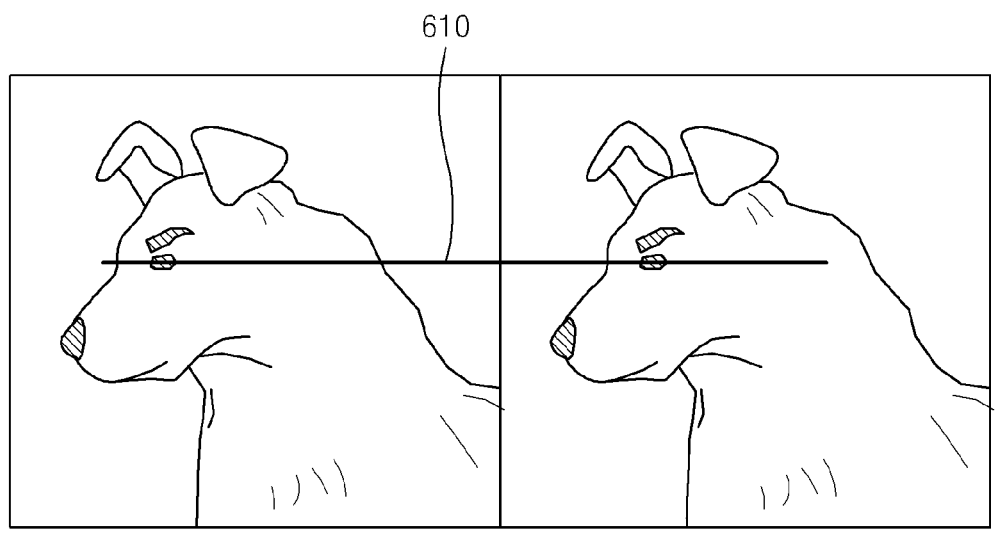

Referring to the left and right source images shown in FIG. 6A, a vertical disparity map between the whole left and right images is analyzed through regression analysis based on feature correspondence information. Then, a shift is performed on the left source image, the right source image, or the left and right source images in correspondence with the vertical-direction difference, so as to remove the vertical-direction difference, as shown in FIG. 6B, for example.

Figure 7:
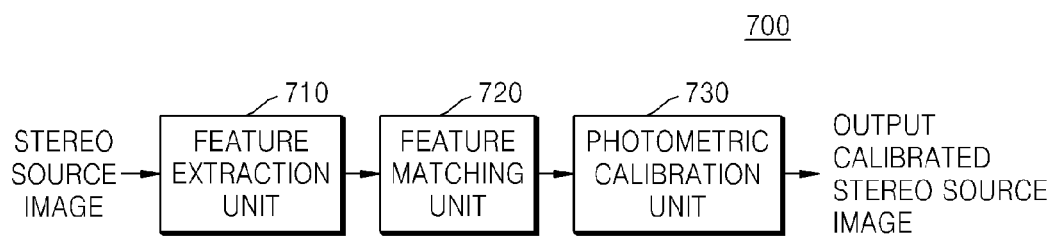
FIG. 7 is a block diagram of the source image calibration unit, shown in FIG. 1, according to another embodiment.
Figure 8:
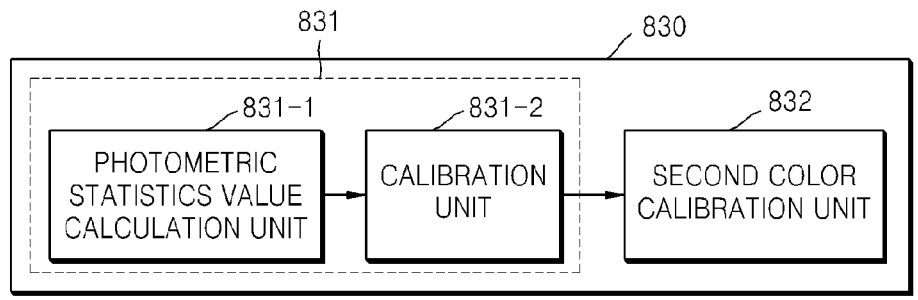
FIG. 8 is a block diagram of a photometric calibration unit, shown in FIG. 7, according to an embodiment.

FIG. 7 is a block diagram of a source image calibration unit 700, shown as the source image calibration unit 110 in FIG. 1, according to an embodiment. FIG. 8 is a block diagram of a photometric calibration unit 830, which is shown as a photometric calibration unit 730 in FIG. 7, according to an embodiment. Hereinafter, a source image calibration unit 700 is described.

Referring to FIG. 7, the source image calibration unit 700 may include a feature extraction unit 710, a feature matching unit 720, and a photometric calibration unit 730.

The feature extraction unit 710 and the feature matching unit 720 are described with reference to the feature extraction unit 210 and the feature matching unit 220 shown in FIGS. 2 and 3. Therefore, a detailed description of the operations of the feature extraction unit 710 and the feature matching unit 720 will not be repeated for the sake of brevity. Hereinafter, the photometric calibration unit 730 is described.

The photometric calibration unit 730 may perform photometric calibration on left and right source images by using feature correspondence information that is generated through the feature extraction unit 710 and the feature matching unit 720. According to an embodiment, photometric calibration may be largely classified into first color calibration for calibrating a global error and second color calibration for calibrating a local error. Referring to FIG. 8, the photometric calibration unit 830 is described.

The photometric calibration unit 830 may include a first color calibration unit 831 that may include a photometric statistics value calculation unit 831-1 and a calibration unit 831-2, and a second color calibration unit 832.

The photometric statistics value calculation unit 831-1 may calculate a statistics value of left and right source images in a location included in feature correspondence information. The calibration unit 831-2 may perform first color calibration on the left and/or right source images based on the statistics value calculated by the photometric statistics value calculation unit 831-1.

The second color calibration unit 832 may perform second color calibration by performing histogram matching on left and right source images that are obtained by performing the first color calibration.

The first color calibration unit 831 may analyze statistical characteristics regarding color characteristics of an original input image in a location of the extracted features. In other words, a problem in which distortion occurs may be resolved by figuring out color characteristics in a location of a feature instead of a whole image, wherein the problem refers to a problem in which distortion occurs when left and right corresponding points are not present, for example, a part that is present in a left source image is not present in a right source image. Accordingly, various statistics values may be employed based on highly-reliable features correspondence information. For example, with respect to each channel in a red, green, and blue (RGB) color space, a mean or a variance of a color image strength in a location of a feature in a left source image may be analyzed. Alternatively, a mean or a variance of a color image strength in a location of a feature in a right source image may be analyzed. In the case of a mean, a statistics value may be calculated by obtaining an arithmetic mean or a geometric mean with respect to a mean, obtained respectively from the left and right source images, and defining a new mean of a color distribution. In the case of a variance, a statistics value may be calculated by using a minimum value, a maximum value, an arithmetic mean value, a geometric mean value, or so on with respect to a variance obtained respectively from the left and right source images. For example, a contrast in an image is decreased when a maximum value of a variance is used, and a contrast in an image is increased when a minimum value of a variance is used. Color characteristics in left and right source images may be matched with each other, by calibrating the left and right source images to comply with a statistics value defined based on information that is identified by using color characteristics of the left and right source images, for example, a mean or a variance. Color calibration has been described with respect to an RGB color space. However, embodiments are not limited thereto, and color calibration may be performed in various color spaces that may include CIELab or YCbCr, for example.

Figure 9A:
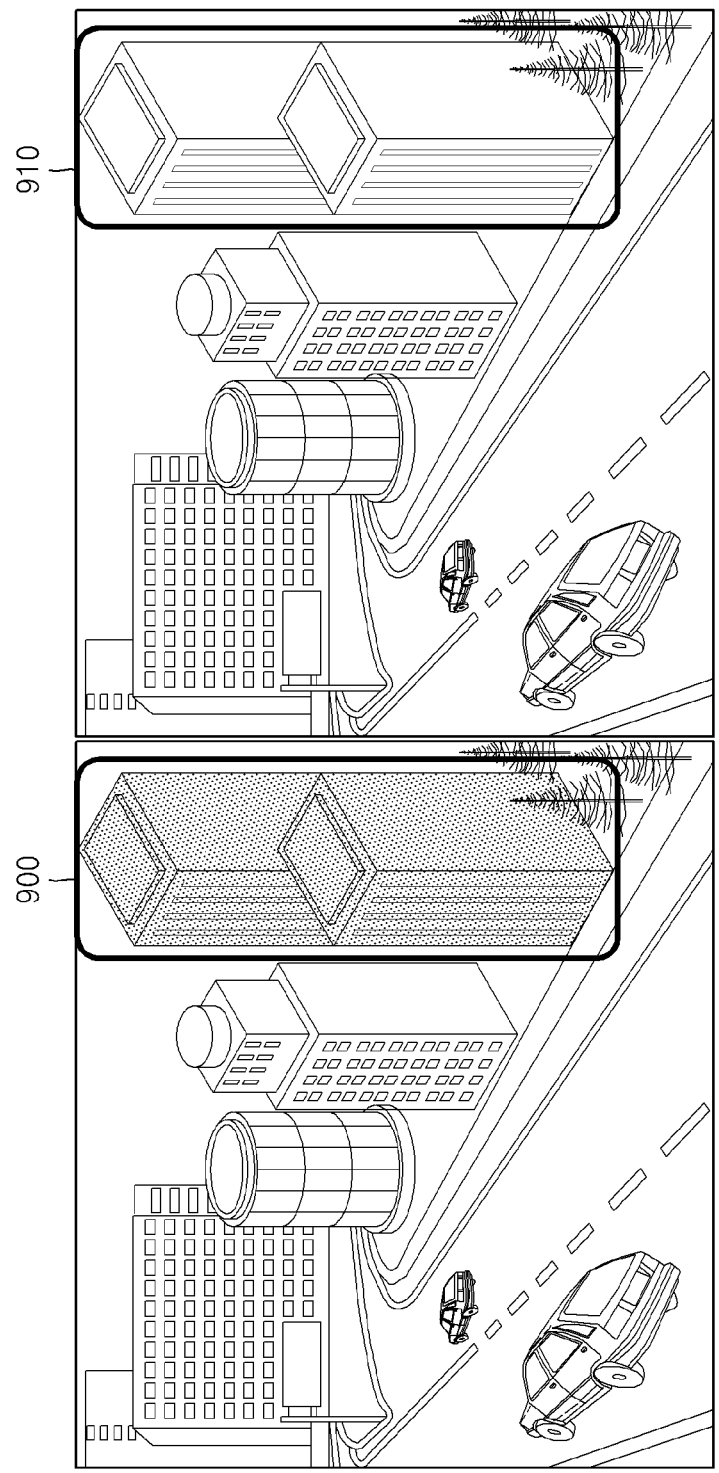
FIGS. 9A and 9B illustrate an example for explaining photometric calibration according to another embodiment.
Figure 9B:
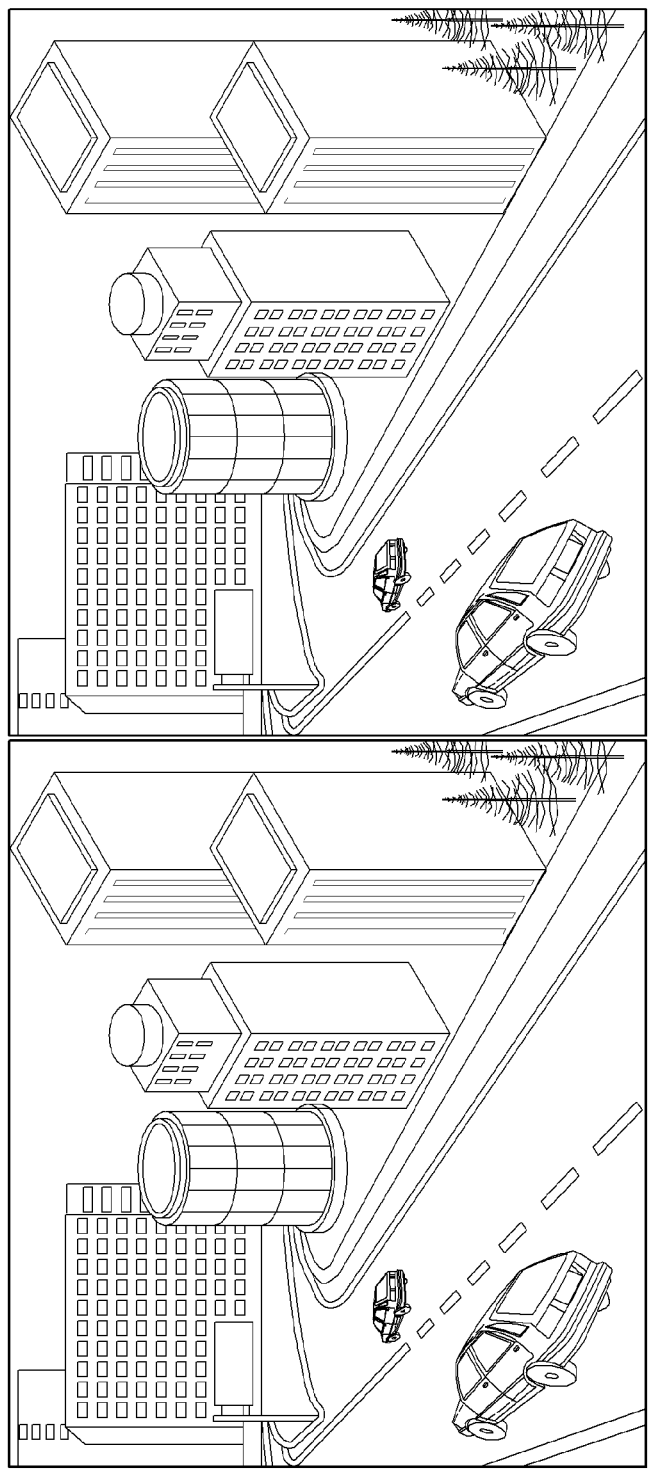

Referring to FIG. 9A, a color of a building 900 in a left source image and a color of a building 910 in a right source image are different from each other. Then, it may be understood that a color of the building 900 becomes identical to a color of the building 910 as a result of matching color characteristics of the building 900 and that of the building 910 with each other through first color calibration according to an embodiment. Alternatively, it may be understood that a color of the building 910 could become identical to a color of the building 900 as a result of matching color characteristics of the building 900 and that of the building 910 with each other through first color calibration according to an alternative embodiment.

The second color calibration unit 832 may perform histogram matching on left and right source images obtained by performing the first color calibration. Second color calibration performed by using histogram matching is to compensate for lack of calibration of a local color error that may occur even after first color calibration is performed according to statistical analysis based on feature correspondence information of left and right source images.

Histogram matching may be performed by generating a histogram with respect to left and right source images based on a color image strength, and calibrating a color so that a height of each of the histogram bins of the left source image is similar to that of the right source images.

Figure 10:
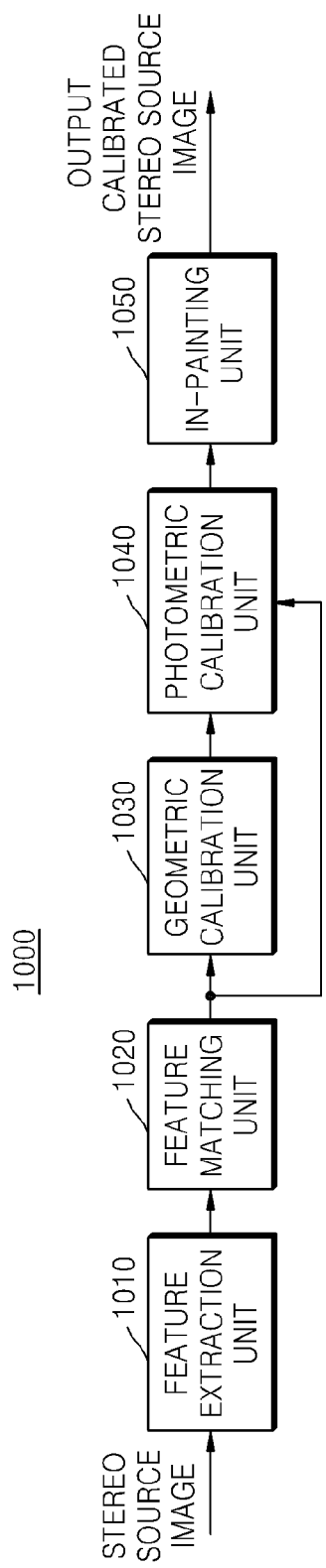
FIG. 10 is a block diagram of the source image calibration unit, shown in FIG. 1, according to another embodiment.

FIG. 10 is a block diagram of a source image calibration unit 1000, shown as the source image calibration unit 110 in FIG. 1, according to an embodiment. According to another embodiment, the source image calibration unit 1000 is described.

Referring to FIG. 10, the source image calibration unit 1000 may include a feature extraction unit 1010, a feature matching unit 1020, a geometric calibration unit 1030, a photometric calibration unit 1040, and an in-painting unit 1050. With respect to an input stereo source image, the source image calibration unit 1000 may extract a feature respectively from left and right source images, and generate feature correspondence information by matching the extracted features with each other. The generated feature correspondence information may be input respectively to the geometric calibration unit 1030 and the photometric calibration unit 1040. The geometric calibration unit 630 may generate a vertical disparity map with respect to the left and right source images, based on a difference between vertical coordinate values that are included in feature correspondence information, and calibrates a difference between the left and right source images by using the generated vertical disparity map. The photometric calibration unit 1040 may receive an input of left and right source images that are obtained after a geometric difference is calibrated by the geometric calibration unit 1030, perform color calibration on the left and right source images obtained after the geometric difference is calibrated, by using feature correspondence information input by the feature matching unit 1020, and then, output a calibrated stereo source image.

In an embodiment, since source image calibration is performed without having to performing a rotation operation that is necessary for typical geometric calibration, a black region or a missing region is very small in a resultant image. Additionally, since a pair of features, which were used for geometric calibration, are reused when photometric calibration is performed, a process prior to the photometric calibration, that is, a process of feature extraction and matching may be performed only once. Thus, calculation time may be reduced. Additionally, since the same features are used, performance of a geometric difference and a color difference may be simultaneously improved by improving performance of feature extraction and matching.

The in-painting unit 1050 may fill a blank space in a boundary area of the calibrated left and right source images after photometric calibration is performed, for additionally performing an in-painting process on black areas.

If sequences of a plurality of source images are input to the source image calibration unit 1000 shown in FIG. 10, geometric calibration and photometric calibration may be independently performed for each image frame. Additionally, geometric calibration and photometric calibration may be performed by using the same feature correspondence information, a vertical disparity map, and a statistics value for every scene change, for example, for a plurality of frames that consist of a same scene, so as to selectively reduce a flicker.

Figure 11:
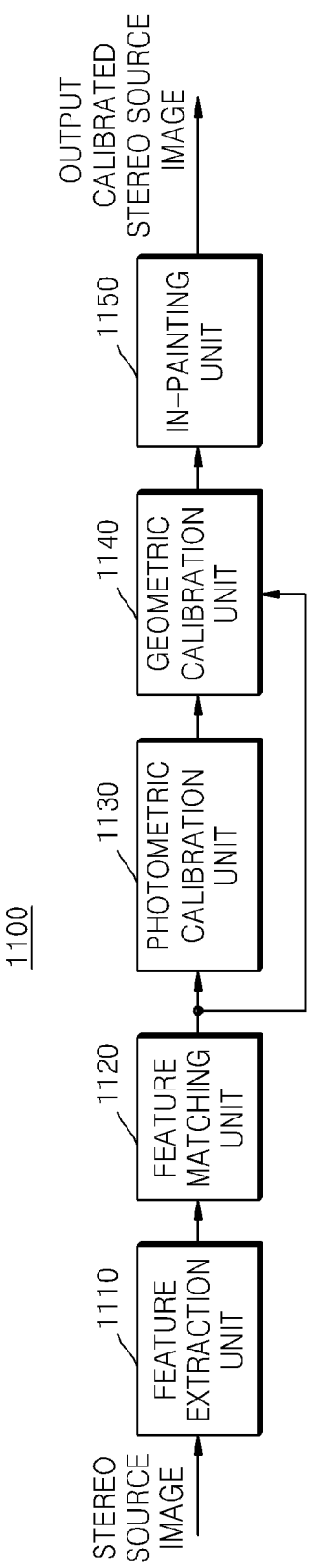
FIG. 11 is a block diagram of the source image calibration unit, shown in FIG. 1, according to another embodiment.

FIG. 11 is a block diagram of a source image calibration unit 1100, which is shown as the source image calibration unit 110 in FIG. 1, according to an embodiment.

Referring to FIG. 11, the source image calibration unit 1100 may include a feature extraction unit 1110, a feature matching unit 1120, a photometric calibration unit 1130, a geometric calibration unit 1140, and an in-painting unit 1150. With respect to an input stereo source image, the feature extraction unit 1110 and the feature matching unit 1120, included in the source image calibration unit 1100, may extract features respectively from left and right source images, and generate feature correspondence information by matching the extracted features with each other. The generated feature correspondence information may be input respectively to the photometric calibration unit 1130 and the geometric calibration unit 1140. The photometric calibration unit 1130 may receive an input of the left and right source images, and calibrate a color difference by using feature correspondence information that is input by the feature matching unit 1120. The geometric calibration unit 1140 may receive an input of the left and right source images, which have already been calibrated by the photometric calibration unit 1130, and generate a vertical disparity map with respect to the left and right source images based on a difference between vertical coordinate values that are included in the feature correspondence information, provided by the feature matching unit 1120. Then, the geometric calibration unit 1140 may calibrate a geometric difference between the left and right source images that are calibrated by using the generated vertical disparity map.

The in-painting unit 1150 may receive an input of left and right source images that are obtained after a geometric difference is calibrated by the geometric calibration unit 1140, and may fill blank spaces nearby each boundary of the left and right source images.

Figure 12A:
FIGS. 12A and 12B illustrate an example of an in-painting process, which is performed by an in-painting unit shown in FIG. 11.
Figure 12B:
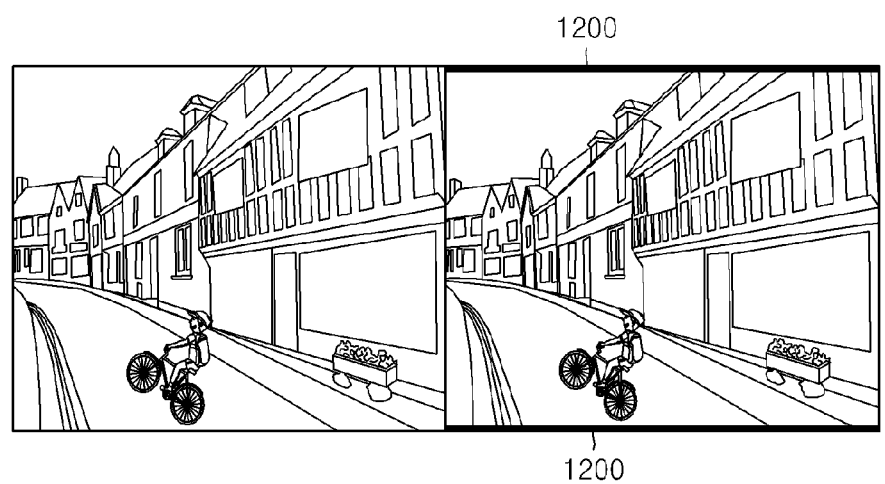

As shown in FIG. 12A, as a result of typical geometric calibration with respect to left and right source images, a plurality of black areas occur after calibration such as rotation of the left and right source images. However, on the contrary to the black areas shown in FIG. 12A, since image warping in a vertical direction is performed by using geometric calibration in the disclosed embodiments, a lot of black areas 1200 do not occur as shown in FIG. 12B. Additionally, the black areas 1200 that occur nearby a boundary area of a right source image may be removed by performing an in-painting process of filling a blank space after geometric calibration.

Figure 13:
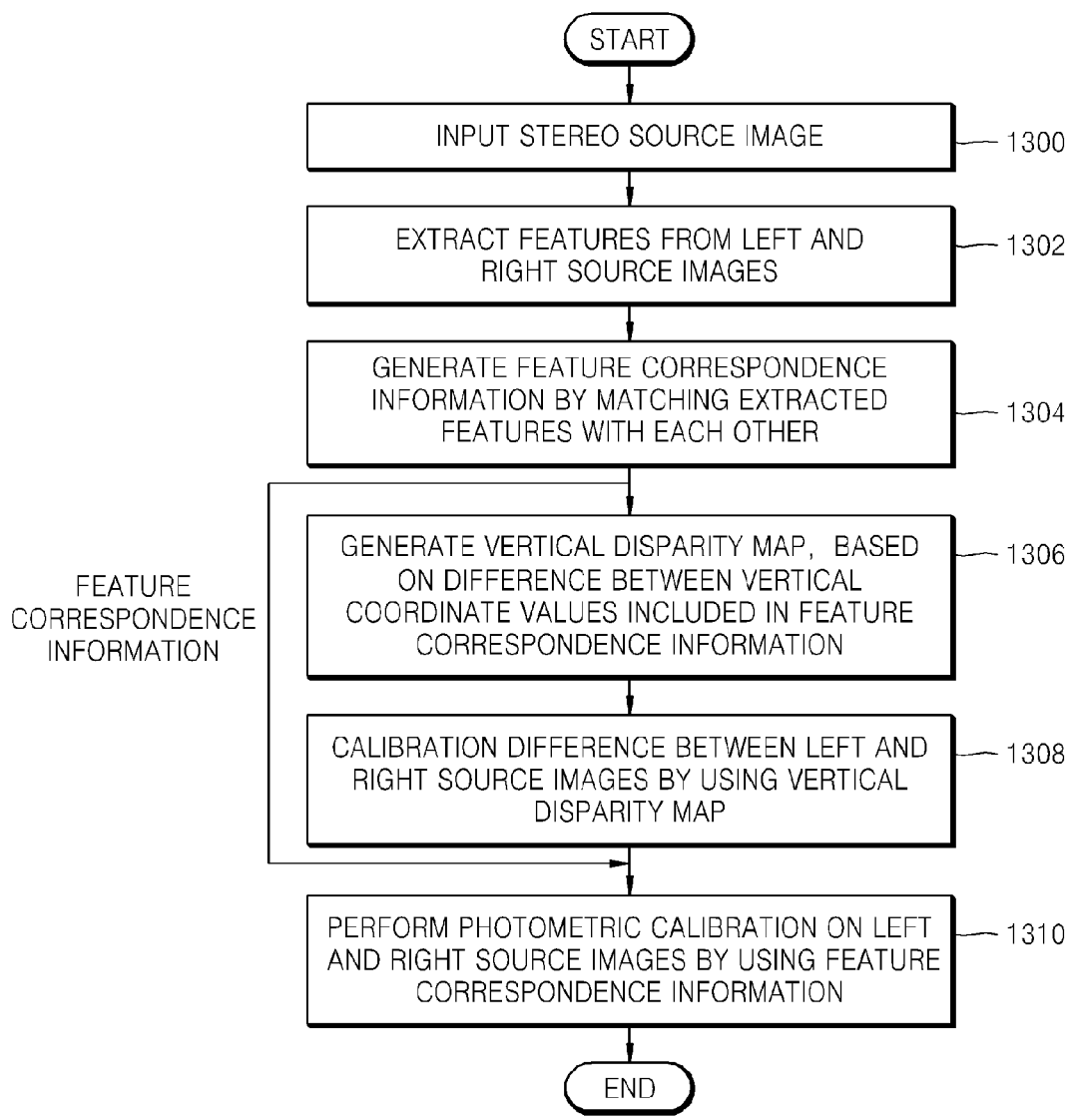
FIG. 13 is a flowchart of a source image calibration method according to another embodiment.

FIG. 13 is a flowchart of a source image calibration method according to an embodiment.

Referring to FIG. 13, in operation 1300, a stereo source image is input.

In operation 1302, features may be extracted from left and right source images. Feature points that correspond to a boundary area, an edge area, and an object area, and information in a location of the feature points may be extracted as features, for example. The extracting of features may be performed by using various feature extraction algorithms, for example, scale-invariant feature transform (SIFT) or speeded up robust features (SURF), but is not limited thereto. Additionally, a sufficient number of features may be extracted from various parts of each image so that the features are significant in subsequent statistics analysis, and features may be extracted from various parts of each image. The extracted features may include information regarding a location of the features, for example, a feature vector.

In operation 1304, feature correspondence information may be generated by matching the extracted features with each other. For example, a feature extracted from the left-eye image and a feature extracted from the right-eye image are matched with each other based on respective feature information, and feature correspondence information is generated. Accordingly, a factor that may distort statistical analysis may be removed by using feature correspondence information, wherein the factor may include a case when left and right corresponding points are not present, for example, when a point that is present in a left-eye image is not present in a right-eye image.

In operation 1306, a vertical disparity map may be generated, based on a difference between vertical coordinate values that are included in the feature correspondence information.

In operation 1308, a difference between the left and right source images may be calibrated by using the generated vertical disparity map. In operations 1306 and 1308, a process of calibrating a geometric difference is performed based on the feature correspondence information generated from the left and right source images. Geometric difference calibration or geometric calibration may be performed by analyzing a vertical disparity map between the whole left and right source images based on feature correspondence information through regression analysis. Then, a shift may be performed on the left source image, the right source image, or the left and right source images in correspondence with the vertical-direction difference, so as to remove the vertical-direction difference.

In operation 1310, photometric calibration of the left and right source images may be performed by using the feature correspondence information generated in operation 1304. In operation 1310, a process of performing color calibration or photometric calibration on left and right sources, which are obtained after a geometric difference is calibrated in operations 1306 and 1308, is performed. Photometric calibration is performed by using the feature correspondence information generated in operation 1304. With respect to the photometric calibration, global color calibration and local color calibration are performed together by calculating a statistics value of the left and right source images in a location included in the feature correspondence information, performing first color calibration on the left and right source images based on the calculated statistics value, and performing second color calibration by performing histogram matching on the left and right source images that are obtained by performing the first color calibration.

In FIG. 13, the geometric calibration performed in operations 1306 and 1308 and photometric calibration performed in operation 1310 may be sequentially performed. However, it will be understood to those skilled in the art that geometric calibration and photometric calibration may be independently performed. Instead of performing photometric calibration after geometric operation, geometric operation may be performed after photometric operation. Additionally, an in-painting process may be additionally performed after performing geometric calibration. An in-painting process may be additionally performed after performing photometric calibration (for example after operation 1310). Further, though not shown in FIG. 13, after the left and right images have undergone geometric calibration and/or photometric calibration, depth information of the left and right images may be restored through a depth estimation algorithm using the depth estimation unit 120. Depth-based rendering may be performed using the depth-based rendering unit 130, based on the restored depth information or a depth map, and thus, a multi-view image may be output, for example to a display.

In the above-described embodiments, by using the method and apparatus for calibrating a stereo source image, a simple and robust stereo source image may be calibrated based on a feature, and thus, a stereo source image may be calibrated before performing depth estimation. Geometric calibration and photometric calibration, described above, may be simultaneously, sequentially, or selectively employed. Geometric calibration and photometric calibration may be simultaneously employed by using feature correspondence information that is generated by extracting and matching a same feature. By way of example, the source image calibration unit 110 of an image processing unit may be controlled (e.g., via a manual input or through an automatic configuration) to perform only geometric calibration on left and right source images, to perform only photometric calibration on left and right source images, to perform geometric calibration on left and right source images before performing photometric calibration on the left and right source images, or to perform photometric calibration on left and right source images before performing geometric calibration on the left and right source images. That is, the source image calibration unit 110 of an image processing unit may be selectively operated to change or switch between performing geometric calibration and/or photometric calibration, and in any particular order, as required or desired. Thus, for example, the source image calibration unit 110 of an image processing unit may be embodied as source image calibration unit 1000 for one set of left and right source images, and may next be embodied as source image calibration unit 1100 for another set of left and right source images.

Geometric calibration may be performed by generating a vertical disparity map through regression analysis based on a difference between vertical coordinates included in feature correspondence information, and calibrating a geometric difference through image warping. Accordingly, a process of optimizing a camera model does not have to be performed, and occurrence of black areas which may occur due to image rotation may be reduced. Additionally, photometric calibration also calibrates a local error by obtaining a mean or a variance in a particular location according to feature correspondence information, performing color calibration with respect to a whole image, and then, locally performing histogram matching.

In the disclosed embodiments, if geometric calibration and photometric calibration are performed together, since an amount of geometric color errors may be very small in a calibrated image, depth estimation may be easily performed. A multi-view image, synthesized through the geometric calibration and the photometric calibration, may comply with an intra-view or an inter-view.

As described above, according to one or more of the above embodiments of the disclosure, a stereo source image may be simply and robustly calibrated based on a feature, and thus, a stereo source image may be calibrated before performing depth estimation.

The apparatuses and methods described herein may include or be implemented using one or more processors, at least one memory for storing program data and executing it, a permanent storage such as a disk drive, a communications port for handling communications with external devices, and user interface devices, including a display, keys, etc. When software modules are involved, these software modules may be stored as program instructions or computer-readable codes executable on the processor on a computer-readable media such as read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. This media can be read by the computer, stored in the at least one memory, and executed by the processor(s).

For example, a processor or processing device may be implemented using one or more general-purpose or special purpose computers, and may include, for example, one or more of a processor, a controller and an arithmetic logic unit, a central processing unit (CPU), a graphics processing unit (GPU), an image processor, a digital signal processor (DSP), a microcomputer, a field programmable array, a programmable logic unit, an application-specific integrated circuit (ASIC), a microprocessor or any other device capable of responding to and executing instructions in a defined manner.

Embodiments may be described in terms of functional block components and various processing steps. Such functional blocks may be realized by any number of hardware and/or software components configured to perform the specified functions. For example, Embodiments may employ various integrated circuit components, e.g., memory elements, processing elements, logic elements, look-up tables, and the like, which may carry out a variety of functions under the control of one or more microprocessors or other control devices. Similarly, where the elements of the disclosure are implemented using software programming or software elements the disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, embodiments could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The terms "module", and "unit," as used herein, may refer to, but are not limited to, a software or hardware component or device, such as a Field Programmable Gate Array (FPGA) or Application Specific Integrated Circuit (ASIC), which performs certain tasks. A module or unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

The particular implementations shown and described herein are illustrative examples of embodiments and are not intended to otherwise limit the scope of the technology in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

The use of the terms "a" and "an" and "the" and similar referents in the context of describing embodiments (especially in the context of the following claims) are to be construed to cover both the singular and the plural. Furthermore, recitation of ranges of values herein are merely intended to function as a shorthand method of referring individually to each separate value falling within the range, unless otherwise indicated herein, and each separate value is incorporated into the specification as if it were individually recited herein. Finally, the steps of all methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. Additionally, it will be understood by those of ordinary skill in the art that various modifications, combinations, and changes can be formed according to design conditions and factors within the scope of the attached claims or the equivalents.

In addition, other embodiments of the disclosure may also be implemented through computer-readable code/instructions in/on a medium, e.g., a computer-readable medium (e.g., a non-transitory computer-readable medium), to control at least one processing element to implement any above described embodiment. The medium can correspond to any medium/media permitting the storage and/or transmission of the computer-readable code. The medium may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, USB memory, and the like. Examples of program instructions include both machine code, such as produced by a compiler, and files containing higher level code that may be executed by the computer using an interpreter. The program instructions may be executed by one or more processors. The described hardware devices may be configured to act as one or more software modules in order to perform the operations of the above-described embodiments, or vice versa. In addition, a non-transitory computer-readable storage medium may be distributed among computer systems connected through a network and computer-readable codes or program instructions may be stored and executed in a decentralized manner. In addition, the non-transitory computer-readable storage media may also be embodied in at least one application specific integrated circuit (ASIC) or Field Programmable Gate Array (FPGA).

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more embodiments of the disclosure. The media may also be a distributed network, so that the computer-readable code is stored/transferred and executed in a distributed fashion. Furthermore, the processing element could include a processor or a computer processor, and processing elements may be distributed and/or included in a single device.

Each block of the flowchart illustrations may represent a unit, module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently (simultaneously) or the blocks may sometimes be executed in the reverse order, depending upon the functionality involved.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the disclosure have been described with reference to the figures, it will be understood by those of ordinary skill in the art that various changes in form and details may be made therein without departing from the spirit and scope of the disclosure as defined by the following claims.

What is claimed is:

1. A stereo source image calibration method comprising:
receiving an input of a stereo source image, and extracting features respectively from left and right source images;
generating feature correspondence information by matching the features, extracted respectively from the left and right source images, with each other;
generating a vertical disparity map with respect to the left and right source images, based on a difference between coordinate values from the feature correspondence information;
calibrating a difference between the left and right source images by using the generated vertical disparity map; and
performing photometric calibration on the left and right source images by:
calculating a statistics value of the left and right source images in a location corresponding to the feature correspondence information,
performing first color calibration on the left and right source images based on the calculated statistics value, and
performing second color calibration by performing histogram matching on left and right source images that are obtained by performing the first color calibration.

2. The stereo source image calibration method of claim 1, wherein the vertical disparity map is generated based on the difference between the vertical coordinate values through regression analysis, and statistically represents the difference between the vertical coordinate values with respect to the left and right source images.

3. The stereo source image calibration method of claim 1, wherein the calibrating of the difference comprises performing a shift on at least one of the left source image and the right source image, so as to calibrate a vertical-direction difference between the left and right source images.

4. The stereo source image calibration method of claim 1, wherein the statistics value comprises a statistics value selected from an arithmetic mean value and a geometric mean value with respect to a mean value of a color image strength of the left and right source images, and
the first color calibration comprises calibrating the mean value of the left and right source images to correspond to the statistics value.

5. The stereo source image calibration method of claim 1, wherein the statistics value comprises a statistics value selected from a minimum value, a maximum value, an arithmetic mean value, and a geometric mean value of a variance value of the color image strength of the left and right source images, and
the first color calibration comprises calibrating the variance value of the left and right source images to correspond to the statistics value.

6. The stereo source image calibration method of claim 1, wherein the photometric calibration is performed in a color space selected from RGB, CIELab, and YCbCr.

7. The stereo source image calibration method of claim 1, wherein a plurality of stereo source images are input in a sequence.

8. The stereo source image calibration method of claim 7, wherein difference calibration with respect to a first stereo source image and difference calibration with respect to a second stereo source image are independently performed.

9. The stereo source image calibration method of claim 7, wherein, when at least two stereo source images among the plurality of stereo source images form a scene, difference calibration with respect to the at least two stereo source images is performed by using a same vertical disparity map.

10. The stereo source image calibration method of claim 1, further comprising performing in-painting for filling an area of holes generated near each boundary of calibrated left and right source images.

11. The stereo source image calibration method of claim 2, wherein the regression analysis comprises one selected from linear regression analysis, generalized linear regression analysis, non-linear regression analysis, kernel regression analysis, non-parametric regression analysis, and robust regression analysis.

12. A non-transitory computer-readable storage medium storing instructions that, when executed by a processor, cause the processor to perform the method of claim 1.

13. A stereo source image calibration apparatus comprising:
a feature extractor to receive an input of a stereo source image, and to extract features respectively from left and right source images;
a feature matcher to generate feature correspondence information by matching the features, respectively extracted from the left and right source images, with each other;
a geometric calibrator to generate a vertical disparity map with respect to the left and right source images based on a difference between vertical coordinate values from the feature correspondence information, and to calibrate a difference between the left and right source images by using the generated vertical disparity map; and
a photometric calibrator to perform photometric calibration on the left and right source images, the photometric calibrator comprising:
a first color calibrator to calculate a statistics value of the left and right source images in a location corresponding to the feature correspondence information, and to perform first color calibration on the left and right source images based on the calculated statistics value, and a second color calibrator to perform second color calibration by performing histogram matching on left and right source images that are obtained by performing the first color calibration.

14. The stereo source image calibration apparatus of claim 13, wherein the vertical disparity map is generated through regression analysis based on the difference between the vertical coordinate values, and statistically represents the difference between the vertical coordinate values with respect to the left and right source images.

15. The stereo source image calibration apparatus of claim 13, wherein the geometric calibrator performs a shift on at least one of the left source image and the right source image, so as to calibrate a vertical-direction difference between the left and right source images.

16. The stereo source image calibration apparatus of claim 13, wherein the statistics value comprises a statistics value selected from an arithmetic mean value and a geometric mean value with respect to a mean value of a color image strength of the left and right source images, and
the first color calibrator calibrates the mean value of the left and right source images to correspond to the statistics value.

17. The stereo source image calibration apparatus of claim 13, wherein the statistics value comprises a statistics value selected from a minimum value, a maximum value, an arithmetic mean value, and a geometric mean value with respect to a variance value of the color image strength of the left and right source images, and
the first color calibrator calibrates the variance value of the left and right source images to correspond to the statistics value.

18. The stereo source image calibration apparatus of claim 13, further comprising an in-painter to fill an area of holes generated near each boundary of calibrated left and right source images.

19. The stereo source image calibration apparatus of claim 13, wherein a plurality of stereo source images are input in a sequence, and difference calibration with respect to a first stereo source image and difference calibration with respect to a second stereo source image are independently performed.

20. A stereo source image calibration apparatus comprising:
a feature extractor to receive an input of a stereo source image, and to extract features respectively from left and right source images;
a feature matcher to generate feature correspondence information by matching the features, respectively extracted from the left and right source images, with each other;
a first color calibrator to calculate a statistics value of the left and right source images in a location from the feature correspondence information, and to perform first color calibration on the left and right source images based on the calculated statistics value; and
a second color calibrator to perform second color calibration by performing histogram matching on left and right source images that are obtained by performing the first color calibration.

21. An image processing apparatus comprising:
a stereo source image calibrator to receive an input of a stereo source image and to extract features respectively from left and right source images, to generate feature correspondence information by matching the features that are respectively extracted from the left and right source images with each other, and to calibrate at least one of a color difference and a geometric difference between the left and right source images based on the feature correspondence information;
a depth estimator to restore depth information through estimation of a depth in the calibrated left and right source images
a depth-based renderer to generate a multi-view image based on the restored depth information; and
a photometric calibrator to perform photometric calibration on the left and right source images, the photometric calibrator comprising:
a first color calibrator to calculate a statistics value on the left and right source images in a location corresponding to the feature correspondence information, and to perform first color calibration on the left and right source images based on the calculated statistics value, and
a second color calibrator to perform second color calibration by performing histogram matching on left and right source images that are obtained by performing the first color calibration.

22. A stereo source image calibration method comprising:
receiving an input of a stereo source image, and extracting features respectively from left and right source images;
generating feature correspondence information by matching the features, respectively extracted from the left and right source images, with each other;
calculating a statistics value of the left and right source images in a location from the feature correspondence information;
performing first color calibration on the left and right source images based on the calculated statistics value; and
performing second color calibration by performing histogram matching on left and right source images that are obtained by performing the first color calibration.

* * * * *